US008055751B2

(12) United States Patent
Riordan et al.

(10) Patent No.: US 8,055,751 B2
(45) Date of Patent: Nov. 8, 2011

(54) IP NETWORK MANAGEMENT BASED ON AUTOMATICALLY ACQUIRED NETWORK ENTITY STATUS INFORMATION

(75) Inventors: James F. Riordan, Rueschlikon (CH); Ruediger Rissmann, Adliswil (CH); Diego M. Zamboni, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/274,717

(22) Filed: Nov. 20, 2008

(65) Prior Publication Data
US 2009/0144419 A1 Jun. 4, 2009

(30) Foreign Application Priority Data
Nov. 20, 2007 (EP) .................................... 07121141

(51) Int. Cl.
*G06F 15/173* (2006.01)
(52) U.S. Cl. ........ 709/223; 709/202; 709/217; 709/218; 709/219; 709/224; 709/226; 709/227; 709/228
(58) Field of Classification Search .................. 709/202, 709/217–219, 223, 224, 226–228
See application file for complete search history.

(56) References Cited

U.S. PATENT DOCUMENTS

| 7,010,585 | B2 * | 3/2006 | Asami | 709/220 |
| 7,046,659 | B1 * | 5/2006 | Woundy | 370/352 |
| 7,562,155 | B2 * | 7/2009 | Nagao | 709/238 |
| 7,827,573 | B2 * | 11/2010 | Taylor et al. | 725/25 |
| 7,864,709 | B2 | 1/2011 | LiCheshire | |
| 2003/0145073 | A1 | 7/2003 | Lee | |
| 2004/0249975 | A1 * | 12/2004 | Tuck et al. | 709/245 |

FOREIGN PATENT DOCUMENTS

JP  2000112851 A  *  4/2000

OTHER PUBLICATIONS

Long-Tao, et al, "The study on protocol spoofing in active sniffing", Journal of China institute of Communications, vol. 24, No. 11, Nov. 2003.
Ahn, et al, "Active Host Information-Based Abnormal IP Address Detection", LNCS 3421, pp. 698-698, 2005.
Irie, et al, "Dynamic DNS for Regional PC Communication System and Its Implementation", Electronics and Communications in Japan, Part 2, vol. 84, No. 2, 2000.
Riaz, How to Configure Dynamic DNS (Fedora Core 4 Setup), www.howtoforge.com/fedora_dynamic_dns, Jan. 10, 2007.

(Continued)

*Primary Examiner* — Liangche A Wang
(74) *Attorney, Agent, or Firm* — William Stock; Anne Vachon Dougherty

(57) ABSTRACT

Methods and apparatus are provided for managing an IP network interconnecting a plurality of network hosts (2). Status information, indicative of status of a host, is automatically acquired from each host (2). The status information, such as MAC address, security and/or operational information, acquired from a host (2) is automatically recorded in at least one DNS record, associated with the IP address of that host (2), of a DNS server (4). The host status information in the DNS records can then be accessed for network management operations. The automatic acquisition and recording of the status information may be performed by a DHCP server (3) of the network on allocation of dynamic IP addresses to hosts (2).

18 Claims, 2 Drawing Sheets

OTHER PUBLICATIONS

AJT, "Configuring Dynamic DNS and DHCP on Debian Stable", www.debian-administration.org/articles/343, Jan. 31, 2006.

NB, "Local DNS serving using BIND and DHCP with Fedora Core Linux", www.cameratim.com/computing/linux/using-bind-as-a-local-dns-server, Dec. 10, 2006.

Foster, "Dynamic DNS with DHCP and BIND9", www.mattfoster.clara.co.uk/ddns.htm, accessed Feb. 22, 2007.

St. Jean, "The Arda.Homeunix.Net DNS & DCHP Setup", www.arda.homeunix.net/ddssetup.html, Jul. 6, 2006.

"Dynamic DNS from DHCP", www.thismetalsky.org/magic/projects/dhcp_dns.html, May 11, 2005.

Rekhter, "Interaction between DHCP and DNS draft-ietf-dhc-dhcp-08.text", www.watersprings.org/pub/id/draft-ietf-dhc-dhcp-dns-08.txt, Mar. 1998.

Stocker, "DHCP server with Dynamic DNS", ezine.daemonnews.org/200408/dnsdchp.html, Jul. 11, 2004.

"How to configure DNS dynamic updates in Windows Server 2003", support.microsoft.com/kb/816592, Oct. 30, 2006.

"Dynamic DNS and DHCP—Easy to do, and you'll thank yourself later", www.semicomplete.com/articles/dynamic-dns-with-dchp/, accessed Feb. 22, 2007.

Kimber, "How to Integrate DCHP and Dynamic DNS", www.nslu2-linux.org/wiki/HowTo/IntegrateDHCPandDynamic/DNS, last modified Sep. 4, 2006.

Park, et al, "The Improvement for Integrity between DHCP and DNS", IEEE, pp. 511-516, Aug. 1997.

\* cited by examiner

| H1.domain.com | A | IP address |
| MAC.owner.domain.com | CNAME | H1.domain.com. |
| MAC.owner.domain.com | HINFO | owner name |

IP NETWORK MANAGEMENT BASED ON AUTOMATICALLY ACQUIRED NETWORK ENTITY STATUS INFORMATION

BACKGROUND OF THE INVENTION

This invention relates generally to management of IP (Internet Protocol) data communications networks, and more particularly to systems for the automatic acquisition and recording of information about network hosts for use in network management operations.

On an IP network, network hosts (i.e. computer systems and devices) are normally identified by their IP addresses. However, it is often desired to obtain additional information about devices for network management purposes such as network monitoring or security operations. For instance, it is often desirable to obtain the hardware network address, i.e. the MAC (Media Access Control) address, of the host at a given IP address. This might be desired, for example, to allow isolation of a virus-infected host from the rest of the network. As another example, host security compliance information, as obtained by security scanning or checking tools, may be desired to control host access to a network. In general, access to various types of host-specific information may be useful or desirable for the spectrum of network management operations. Unfortunately, there is no convenient way of obtaining such information about hosts. Some types of host information might be captured in various system logs during operation of a network, but retrieving specific host information by analysis of such logs can be difficult or even impossible in practice. Some host information might be manually recorded by network administrators in a system repository, e.g. for network or system configuration details, but maintaining up-to-date information on all network hosts can involve considerable effort.

To compound the problem described above, IP addresses are often assigned dynamically in operation of IP networks. This can be done, for example, using DHCP (Dynamic Host Configuration Protocol). With this system, a DHCP server maintains a pool of IP addresses which can be allocated on request to devices joining a network. A dynamically-assigned IP address is effectively leased to a requesting host by the DHCP server. A host can renew the lease periodically to maintain its IP address allocation. Failure to renew the lease results in the IP address being returned to the pool for reallocation to another device. Dynamic DNS (Domain Name System) provides another mechanism for dealing with dynamic IP addresses. DNS is a well known and widely-used system, but it is useful at this point to give a brief explanation of the DNS system to assist understanding of the invention to be described.

DNS servers form a distributed database whose primary purpose is to map host names, in the form of fully-qualified domain names such as abc.domain.com, to IP addresses. The distributed system of DNS servers provides the mechanism for obtaining the IP address corresponding to a particular host name, for instance in a URL (Universal Resource Locator) typed into a web browser, thus allowing the application in question to communicate with that host, e.g. to retrieve a web page. Information is stored in DNS servers in records of various types which are defined by the DNS protocol. A DNS Address record specifies the IP address corresponding to a host name, but other types of DNS records may be associated with the name, and hence IP address, of a host. By way of example: multiple host names can be specified as aliases for a given IP address using Canonical Name (CNAME) records; a Host Information (HINFO) record can be set up to give operating system information for a host name; and arbitrary text can be associated with a host name in a Text (TXT) record. The DNS server(s) for a domain are typically maintained by the owner of that domain. In traditional networks with static IP addresses, all DNS record entries were made manually by network administrators, for example when devices were added to a network. With dynamic IP addresses managed by a DHCP server as described above, the DNS server contains a set of manually-entered DNS records, pointing to the corresponding addresses in the address pool of the DHCP server, for the range of IP addresses in question. As mentioned above, Dynamic DNS provides another mechanism for dealing with dynamic IP addresses. This protocol allows a host to notify the DNS server of its name and IP address whenever its IP address changes. The DNS server can then update the IP address in the DNS Address record for the host name accordingly.

Whatever the dynamic IP address mechanism, the effect is that a given host may not always have the same IP address, and a given IP address may be associated with multiple hosts over time. This is a major obstacle to obtaining reliable host information in IP networks where the primary host identifier is the IP address. Existing solutions rely on dynamic querying of individual devices when information is desired. As an illustrative scenario, a network administrator may wish to locate the host with a particular MAC address in a network. A host MAC address is not generally visible to network systems beyond the first switch or router to which the host is connected. The administrator therefore dynamically queries the routers and switches in the network, effectively asking each one "Have you seen this MAC address?" In general, the "dynamic query" approach to obtaining host information depends heavily on the brand of network devices being used and on the specific layout of the network. Furthermore, for tasks such as host-identification based on MAC address as just described, querying is needed for each device that needs to be identified, introducing additional delays and overhead when a large number of devices need to be identified.

SUMMARY OF THE INVENTION

A first aspect of the present invention provides a method for managing an IP network interconnecting a plurality of network hosts. The method comprises:

automatically acquiring from each host status information indicative of status of that host;

automatically recording the status information acquired from each host in at least one DNS record, associated with the IP address of that host, of a DNS server; and accessing the host status information in the DNS records for network management operations.

In embodiments of the present invention, therefore, information indicative of the status of network hosts is obtained automatically from hosts in operation of the network. The host status information may comprise a variety of host-specific information relating, for example, to the location, condition or operating state of the host, and in particular conveying information about the host beyond a mere host name. The host status information is then automatically recorded in one or more DNS records associated with the host IP address. The status information will then be available for access subsequently in response to a DNS query specifying the IP address—the key piece of information that is always known for a host. The host status information can thus be accessed as desired, and network management operations performed in dependence on the information so obtained. Embodiments of the invention thus exploit DNS records as a highly convenient repository of host status information for use in network management, where "network management" is used here in the general sense of network monitoring, maintenance and control functions. The DNS system is a well-established and widely-used system which is simple to operate and interface with. Virtually all current network devices have the facility to interface with DNS servers, and embodiments of the invention can exploit this existing DNS functionality for the recording and retrieval of host status information. Queries for host information can therefore be made using an efficient and standard protocol, avoiding the need for complex device-specific queries. The use of another database to store host information can also be avoided, and the information made accessible using existing tools and libraries. Moreover, the automatic acquisition and recording process enables information to be kept up-to-date more easily than conventional manually-maintained system databases. An elegantly simple and highly efficient system is therefore provided for making information about hosts, which might otherwise be difficult or impossible to obtain in operation of a network, available for network management operations.

Depending on the particular nature of the host status information and management operations in question, the auto-acquisition process may be performed periodically or in response to particular events, with previously recorded information being dynamically updated accordingly. Various examples will be described below.

Status information may be acquired in general for all or a subset of network hosts, and different status information may be obtained for different types or groups of hosts.

The auto-acquisition and recording mechanism may be a centralized or distributed mechanism. In preferred embodiments, this functionality is performed by at least one server of the network. In particular, automatic acquisition and recording of status information for a host is preferably performed by a DHCP server of the network as part of the IP address allocation process for the host. This may be done, in general, for both dynamic and static IP addresses as discussed further below. Ideally, the auto-acquisition and recording process is first performed on initial allocation of an IP address to a host, and subsequently performed on renewal of the IP address allocation for the host.

Since host status information is recorded in association with the host IP address, it is always possible to access the information via a DNS query supplying the IP address. However, the DNS protocol allows information to be looked up under (full) host name, i.e. the fully-qualified domain name (FQDN), or in some cases a portion of the FQDN, as well as under IP address. Thus, in preferred embodiments, at least a portion of the status information acquired from a host may be recorded in a FQDN of a DNS record associated with the host IP address. DNS records may then be looked up by supplying the aforementioned status information, to retrieve the corresponding IP address and any other host status information associated with that address. The aforementioned status information could be recorded as the real, i.e. actual standard or "canonical" FQDN for the host. However, it is preferable to maintain the usual DNS Address record linking the real host FQDN to its IP address, and to record status information in another associated record, for example in the form of alias names in CNAME records.

The status information acquired for a host preferably comprises at least the MAC address of that host. However, status information may also comprise information indicative of the security state or operational parameters of hosts as described further below.

A second aspect of the invention provides a system for managing an IP network interconnecting a plurality of network hosts. The system comprises:

control logic for automatically acquiring from each host status information indicative of status of that host, and for automatically recording the status information in at least one DNS record, associated with the IP address of that host, of a DNS server; and network management logic for accessing the host status information in the DNS records and performing network management operations in dependence on said information.

A third aspect of the invention provides a DHCP server system for controlling IP address allocation in an IP network interconnecting a plurality of network hosts, the system including control logic adapted such that, on allocation by the system of an IP address to a host, the control logic:

acquires from the host status information indicative of status of that host; and records the status information in at least one DNS record, associated with the IP address of that host, of a DNS server.

The invention also provides a computer program comprising program code means for controlling a DHCP server in an IP network such that, on allocation by the DHCP server of an IP address to a network host, the server acquires from the host status information indicative of status of that host, and records the status information in at least one DNS record, associated with the IP address of that host, of a DNS server. A computer program embodying the invention may constitute an independent program or may be an element of a larger program, and may be supplied, for example, embodied in a computer-readable medium such as a disk or an electronic transmission for loading in a computer. (It will be understood that the term "computer" is used in the most general sense and includes any device, component or system having a data processing capability for implementing a computer program). The program code means of the computer program may comprise any expression, in any language, code or notation, of a set of instructions intended to cause a computer to perform the method in question, either directly or after either or both of (a) conversion to another language, code or notation, and (b) reproduction in a different material form.

BRIEF DESCRIPTION OF THE DRAWINGS

Preferred embodiments of the invention will now be described, by way of example, with reference to the accompanying drawings in which.

DETAILED DESCRIPTION OF THE INVENTION

Figures 1, 2:
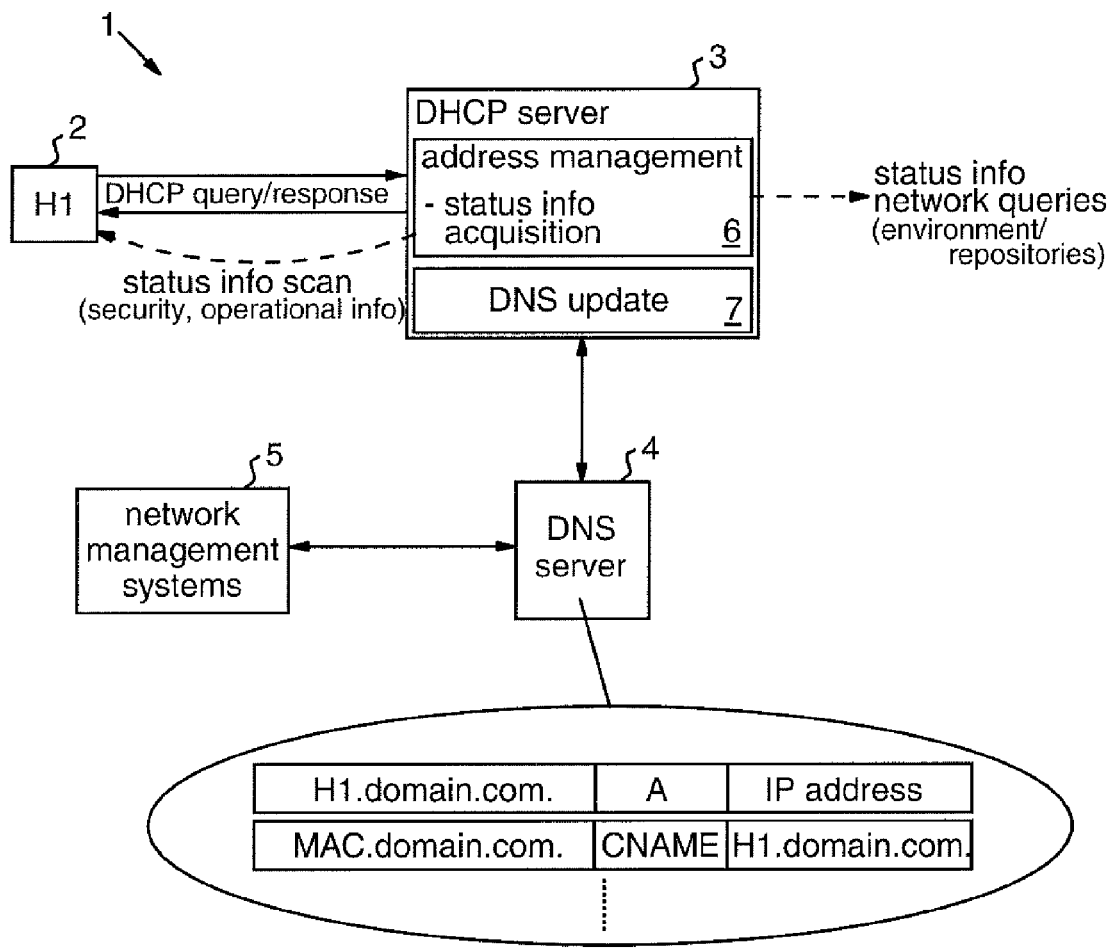
FIG. 1 is a schematic representation of a system embodying the invention for managing an IP network.
FIG. 2 is a schematic illustration of DNS records recorded in the FIG. 1 system.

FIG. 1 shows an embodiment of a system 1 for managing an IP network comprising a plurality of network hosts 2, only one host H1 being shown in the figure for simplicity. Hosts 2 are configured for IP data communications via the network which, though not specifically shown in the figure, includes the usual network systems, links, switches, routers etc. The system 1 includes a DHCP server 3, a DNS server 4 and various network management systems, indicated generally at 5, which have access via the network to DNS server 4.

DHCP server 3 performs IP address management generally in accordance with the DHCP protocol, but has additional functionality as described in detail below. In this example, it is assumed that DHCP server 3 handles allocation of dynamic IP addresses among hosts as they join and leave the network. This process is performed by an address management module 6 of the server 3. As part of this process, address management module 6 automatically acquires host status information, indicative of status of the host in question, as discussed further below. DHCP server 3 also includes a DNS update module 7. This module allows DHCP server 3 to record host status information automatically in DNS server 4 as described below. It will be understood that, in general, the logic constituting modules 6 and 7 may be implemented in hardware or software or a combination thereof. In particular, the logic may be implemented by a processor configured by program instructions to perform the operations described. Suitable program instructions will be apparent to those skilled in the art from the description herein.

In operation, when a host 2, such as host H1, joins the network, it sends a DHCP query to DHCP server 3 requesting an IP address on the network. The DHCP query identifies the host by name, here H1, and MAC address. In reply, address management module 6 allocates an available IP address to H1 and notifies the host of its address allocation via a DHCP response. The MAC address of hosts is thus briefly available at the point of IP address allocation. In prior systems, this information would effectively be lost to subsequent processes, buried in system logs. In the present system, however, the MAC address is captured by address management module 6. The MAC address is then supplied to DNS update module 7 as host status information for H1, together with the allocated IP address. The DNS update module communicates with DNS server 4 to record the MAC address in a DNS record associated with the IP address of H1. Specifically, via communication with DNS server 4, update module 7 sets up the DNS records illustrated schematically in the enlargement of FIG. 1. This shows a simplified representation of two DNS records. The top record is a DNS Address record, identified by the letter "A" in the record-type field. The second record is a Canonical Name record, identified by "CNAME" in the record-type field. The Address record links the FQDN, here H1.domain.com, of host H1 to its IP address as allocated by DHCP server 3. The additional CNAME record is used here to record the MAC address of H1. In particular, CNAME records are used to record aliases for a given real (canonical) FQDN. In this embodiment, the MAC address acquired for H1 is recorded as the host name in an alias FQDN for H1. The alias FQDN is represented in the figure as MAC.domain.com., and is linked by the CNAME record to the real FQDN H1.domain.com. Thus, for example, if a host machine with MAC address 00:09:6B:C2:CE:09 is assigned the IP address 9.4.23.9 by DHCP server 3, the alias name 00096BC2CE09.domain.com. could be entered in the CNAME record against the real host FQDN. This CNAME record is associated, via the Address record for the real FQDN, with the IP address of the host, whereby the MAC address resolves to the appropriate IP address 9.4.23.9.

In subsequent operation, network management systems 5 can access DNS server 4 in the usual way to retrieve host status information for use in various network management operations. In particular, the DNS protocol allows records to be accessed via IP address or host name. By supplying the IP address, a system 5 can retrieve all records associated with that address. In the present example, therefore, a DNS query under host H1's IP address will yield the MAC address in the associated CNAME record. In addition, a DNS query specifying H1's MAC address as a host name will yield the IP address for the real FQDN of H1 specified in the CNAME record.

The basic mechanism described above can be extended to allow various other host-specific information to be acquired and recorded as host status information in DNS records. For example, on allocation of an IP address, address management module 6 may perform additional acquisition operations as indicated by the broken arrows in the figure. Specifically, module 6 may scan hosts 2 for security information indicative of the security state of the host, and/or operational information indicative of operational parameters of the host. Additionally or alternatively, module 6 may query the environment (network switches etc.) or network repositories for such information. In scanning hosts, some host status information may be available to module 6 without host participation. Hosts may also be adapted to supply specific status information as part of a modified DHCP query/response process or through additional protocols as needed. Examples of operational information which could be acquired without host participation include: network switch and port to which the host device is connected; physical location; time at which the host joined the network; and device information such as owner, model, etc. If module 6 includes security scanning tools, the results of external security scans of hosts can be obtained as host security information without host participation. With host participation, security information can include the results of local security scans or compliance results (e.g. information collected by a workstation security tool or other client-based security agent), and Trusted Computing Base credentials, obtained from a Trusted Platform Module where provided in the host, which can verify the integrity of the host system configuration. Operational information which can be acquired with host participation includes device information such as local configuration details, user log-in status, load level, etc.

The additional host status information can be recorded in DNS records by update module 7 in a variety of ways. For example, information could be recorded in other DNS records, such as an HINFO record, associated with the host IP addresses. A simple example of this is illustrated in FIG. 2. Here, an alias name for host H1 is defined in a CNAME record as MAC.owner.domain.com., and the HINFO record for that alias specifies the owner information for host H1 in the HINFO field. Any host information useful for look-up purposes could be stored as the host name in DNS records, and may map to various other types of host information, allowing access to that information via a DNS query supplying the host name in question. Host status information might also be stored in other DNS records, such as Text records for example. In addition, the facility for aliases allows large numbers of DNS records to be associated with a given host IP address, allowing large quantities of useful host status information to be recorded in DNS server 4.

When a host 2 renews its lease on an IP address with DHCP server 3, address management logic 6 can reacquire some or all of the host status information initially acquired for that host. This is then supplied to DNS update module 7 which updates the host information in DNS server 4 accordingly. If a host's DHCP lease expires, address management module 6 instructs update module 7 to delete records created for that host as appropriate. In particular, records rendered obsolete by expiry of the lease can be deleted, while records holding still-relevant information can be preserved. For example, a record specifying the switch to which the host was connected can be deleted, whereas records containing the last scan results for the host can be maintained for subsequent retrieval via host MAC address, and thereby preserved across leases. In this way an up-to-date image of the host status is always maintained in DNS server 4. Conveniently, operation of DNS update module 7 can be based on the Dynamic DNS system mentioned above, modified as necessary to allow host status information to be recorded/updated in DNS records in addition to the basic IP address update process accommodated by the prior system. Suitable modifications to the Dynamic DNS system will be apparent to those skilled in the art from the description herein.

When host status information is subsequently desired by network systems, it can be accessed via DNS queries to server 4 specifying IP address or host name (or status information recorded as a host name) as described above. For example, security information recorded as host status information can be accessed subsequently by network systems for network admission control, i.e. controlling accessibility of network services to hosts in dependence on host security state. Such information might be used to determine whether a host is permitted access to a network at all, or whether it can access specific systems/services within the network. Operational information recorded as status information may be accessed for a variety of network management purposes such as monitoring the state or health of the network, including intrusion detection and response operations, as well as security operations such as network admission control. Particular examples of network management operations exploiting the host status information are illustrated in FIGS. 3 and 4.

Figure 3:
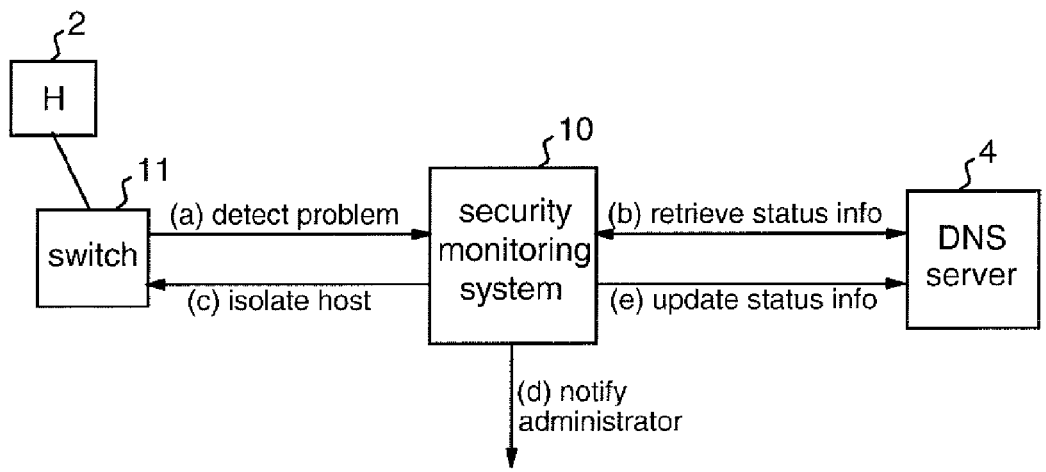
FIGS. 3 and 4 illustrate exemplary network management operations in the FIG. 1 system.

FIG. 3 shows a network management system 5 of FIG. 1 in the form of a security monitoring system 10. The security monitoring system 10 comprises logic for monitoring network operation to detect malicious activity from hosts, e.g. activity arising from virus or worm infections. On detecting malicious activity from an IP address as indicated by arrow (a) in the figure, system 10 issues a DNS query to DNS server 4 to retrieve host status information for that IP address as indicated by arrow (b). In this example, system 10 retrieves status information identifying the switch 11 to which the infected host H is connected. Next, security system 10 controls switch 11 so as to isolate the host H from the rest of the network as indicated by arrow (c). The system then alerts a network administrator (arrow (d)) and/or the owner of the isolated host if the owner information was retrieved with the host status information in step (b). System 10 here also includes a DNS update module 7 allowing the system to update the host status information in DNS server 4, as indicated by arrow (e), to indicate the isolated state of the host.

Figure 4:
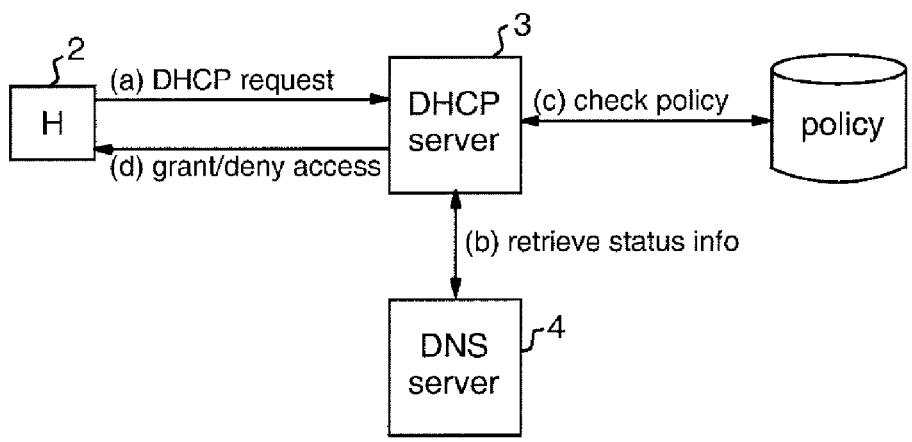

FIG. 4 illustrates operation of system 1 for network admission control. Arrow (a) represents a DHCP request to server 3 when a host H connects to the network and requests an IP address. In step (b), DHCP server 3 issues a DNS query to DNS server 4 under the host MAC address to retrieve security compliance information, e.g. security or integrity check results, last scan results, patch level, etc., previously recorded as host status information. In step (c) the server 3 checks a security policy maintained by a network system for the access requirements, and determines whether the host H meets the security standard. In step (d) the DHCP server then grants or denies network access to the host as appropriate.

Network management systems 5 may utilize host status information in DNS server 4 for various other network management operations where accurate, device-specific information is desired and may not be readily available from other sources. These include network inventory processes, trusted computing base evaluation, security scanning and compliance checking, as well as other intrusion response or network access control functions. By enabling the DHCP server 3 to dynamically record and update host status information in DNS records as part of the dynamic address management process, the status information is made available in a convenient and widely-accessible repository. The problem of maintaining consistent and valid system logs is obviated by ensuring that the operations a host device performs or must perform to stay in a network (i.e. renewing its IP address with the DHCP server) result in updating of the host status information in the DNS server. The host information is thus automatically kept up-to-date in an existing database, ensuring accuracy, consistency and timeliness of the data, and queries for host information can be made using an efficient and standard protocol.

Operation of the FIG. 1 system has been described with reference to a dynamic-address network where the problem of acquiring and maintaining reliable host status information is most acute because the mapping from IP address to host device changes constantly. However, other embodiments of the invention may automatically acquire and record status information for host systems with static IP addresses. In particular, the system can be employed to track dynamic information about hosts with static IP addresses. For example, host status information such as user log-in status, load level, local security results, etc., is useful information to have about any system on a network, not just systems with dynamic addresses. Here, status information could be automatically acquired from hosts by a distributed reporting mechanism, for example based on the Dynamic DNS system extended to accommodate the recording and updating of the host status information. Preferably, however, the DHCP server can control the auto-acquisition and recordal process for hosts with static addresses as well as those with dynamic addresses. This can be achieved by exploiting a DHCP facility to always assign the same IP address to a host with a given MAC address. Thus, a host with a static address will perform the same operations as a host with a dynamic address, and the DHCP server will respond accordingly, except that the IP address allocated by the DHCP server is always the same.

Figure 5:
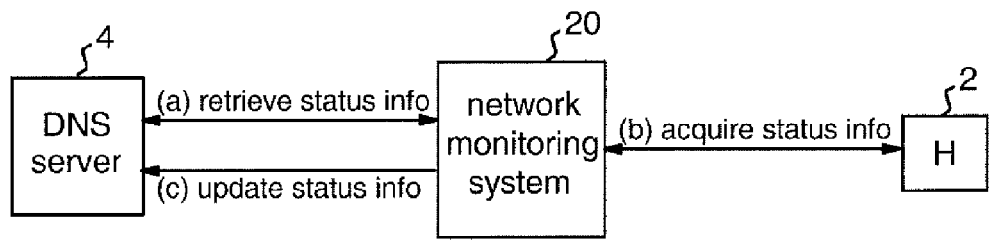
FIG. 5 illustrates operation of an additional network management system embodying the invention.

FIG. 5 illustrates operation of a network management system which may be employed in a network in addition or as an alternative to the system 1 already described. Here, the DNS server 4 stores host status information supplied via a mechanism described above, such as the DHCP server 3 of FIG. 1. A network monitoring system 20 is configured by logic to periodically query the DNS server 4 for all IP addresses on the network. In response, as indicated by arrow (a), the DNS server 4 supplies the host status information recorded in DNS records including ownership/group information for all hosts. Monitoring system 20 uses the retrieved host information to connect to each host 2 and collect host status information (arrow (b)) such as CPU/disk usage, compliance information, etc. Next, as indicated by arrow (c), a DNS update module of monitoring system 1 connects to the DNS server to update the host DNS records with the status information so acquired.

Various changes and modifications can of course be made to the specific embodiments described above. For example, the DNS and DHCP servers are illustrated as separate entities in the embodiments described, with the DHCP server being authorised as necessary to record and update DNS records. In other embodiments, the DNS server for the DHCP range of IP addresses could be located in the same machine as the DHCP server, whereby the DHCP server can access the DNS records directly without authorisation. Also, while one DNS server is shown in the embodiments described, a plurality of DNS servers may be utilized in operation of systems embodying the invention. As another example, a host MAC address (or other host status information) could be recorded as the host name in the canonical FQDN specified in the DNS Address record for a host. In general, however, it will be preferable to specify the real host name in the DNS Address record in the usual way. Many other changes can be made to the exemplary embodiments described without departing from the scope of the invention.

The invention claimed is:

1. A method for managing an IP network interconnecting a plurality of network hosts, the method comprising:
automatically acquiring from each host status information indicative of status of that host;
automatically recording the status information acquired from each host in at least one DNS record, associated with the IP address of that host, of a DNS server; and
acquiring the host status information in the DNS records for network management operations, wherein the status information for a host comprises at least one of security information indicative of the security state of that host and operational information indicative of operational parameters of that host, the method including accessing the acquired host status information for a host to perform at least one of controlling accessibility of network services to the host in dependence on said security state and monitoring the state of the network, and network security operations, to control accessibility of network services to hosts, in dependence on said operational information.

2. A method according to claim 1 wherein the automatic acquisition and recording of status information is performed by at least one server of the network.

3. A method according to claim 2 wherein automatic acquisition and recording of status information for a host is performed by a DHCP server of the network on allocation of an IP address to that host.

4. A method according to claim 3 wherein said automatic acquisition and recording is first performed on initial allocation of an IP address to the host, and subsequently performed on renewal of the IP address allocation for the host.

5. A method according to claim 1 including recording at least a portion of the status information acquired from a host in a fully-qualified domain name of a DNS record associated with the IP address of that host.

6. A method according to claim 1 including recording at least a portion of the status information acquired from a host in a DNS record which is associated with a DNS Address record defining the real fully-qualified domain name for the IP address of that host.

7. A method according to claim 1 wherein the status information for a host further comprises the MAC address of that host.

8. A method according to claim 7 including recording the MAC address as the host name of a fully-qualified domain name in a DNS record associated with the IP address of that host.

9. A system for managing an IP network interconnecting a plurality of network hosts, the system comprising:
at least one processor for executing logic;
control logic for automatically acquiring from each host status information indicative of status of that host, and for automatically recording the status information in at least one DNS record, associated with the IP address of that host, of a DNS server; and
network management logic for accessing the host status information in the DNS records and performing network management operations in dependence on said information, wherein the status information for a host comprises at least one of security information indicative of the security state of that host and operational information indicative of operational parameters of that host, and wherein the network management logic is adapted to perform at least one of controlling accessibility of network services to the host in dependence on the security state indicated by the security information for that host and monitoring the state of the network, and network security operations, to control accessibility of network services to hosts, in dependence on said operational information.

10. A system according to claim 9 wherein the control logic is provided in at least one server of the network.

11. A system according to claim 10 wherein the control logic is provided in a DHCP server of the network and is adapted to perform the automatic acquisition and recording of status information for a host on allocation by the DHCP server of an IP address to that host.

12. A system according to claim 9 wherein the control logic is adapted to record at least a portion of the status information acquired from a host in a fully-qualified domain name of a DNS record associated with the IP address of that host.

13. A system according to claim 9 wherein the control logic is adapted to record at least a portion of the status information acquired from a host in a DNS record which is associated with a DNS Address record defining the real fully-qualified domain name for the IP address of that host.

14. A system according to claim 9 wherein the status information for a host further comprises the MAC address of that host.

15. A system according to claim 14 wherein the control logic is adapted to record the MAC address as the host name of a fully-qualified domain name in a DNS record associated with the IP address of that host.

16. A DHCP server system for controlling IP address allocation in an IP network interconnecting a plurality of network hosts, the system including at least one processor for executing control logic adapted such that, on allocation by the system of an IP address to a host, the control logic:
acquires from the host status information indicative of status of that host;
records the status information in at least one DNS record, associated with the IP address of that host, of a DNS server; and
acquires the host status information in the DNS records for network management operations, wherein the status information for a host comprises at least one of security information indicative of the security state of that host and operational information indicative of operational parameters of that host, the method including accessing the acquired host status information for a host to perform at least one of controlling accessibility of network services to the host in dependence on said security state and monitoring the state of the network, and network security operations, to control accessibility of network services to hosts, in dependence on said operational information.

17. A system according to claim 16 wherein the control logic is adapted such that the acquisition and recording of status information for a host is first performed on initial allocation of an IP address to the host and subsequently performed on renewal of the IP address allocation for the host.

18. A non-transitory computer readable medium containing executable program instructions for controlling a DHCP server in an IP network interconnecting a plurality of network hosts such that, on allocation by the DHCP server of an IP address to a host, the server acquires from the host status information indicative of status of that host, records the status information in at least one DNS record, associated with the IP address of that host, of a DNS server; and acquires the host status information in the DNS records for network management operations, wherein the status information for a host comprises at least one of security information indicative of the security state of that host and operational information indicative of operational parameters of that host, and wherein the server further performs at least one of controlling accessibility of network services to the host in dependence on said security state and monitoring the state of the network, and network security operations, to control accessibility of network services to hosts, in dependence on said operational information.

* * * * *